United States Patent [19]

Bacon

[11] Patent Number: 5,480,107
[45] Date of Patent: Jan. 2, 1996

[54] 3X MULTI-ENGINE JET CONFIGURATION

[76] Inventor: Richard J. Bacon, 1268 Northridge Ct., Golden, Colo. 80401

[21] Appl. No.: 225,585

[22] Filed: Apr. 11, 1994

[51] Int. Cl.[6] ................................................. B64D 27/20
[52] U.S. Cl. ............................................ 244/55; 244/58
[58] Field of Search .................................. 244/53 R, 54, 244/55, 15, 12.3

[56] References Cited

U.S. PATENT DOCUMENTS

| | | |
|---|---|---|
| 1,132,368 | 3/1915 | Lorenc et al. . |
| 1,850,066 | 3/1932 | Altieri . |
| 1,851,857 | 3/1932 | Marney . |
| 2,244,763 | 6/1941 | Bugatti ........................... 244/55 |
| 2,406,625 | 8/1946 | Oglesby .......................... 244/13 |
| 2,523,938 | 9/1950 | Berliner ......................... 244/15 |
| 2,540,991 | 2/1951 | Price ............................. 244/15 |
| 2,557,522 | 6/1951 | Vautier .......................... 244/55 |
| 2,896,882 | 7/1959 | Nelson ........................... 244/55 |
| 2,978,208 | 4/1961 | Halsmer ......................... 244/53 |
| 3,113,636 | 12/1963 | Brown et al. ................... 244/55 |
| 3,678,690 | 7/1972 | Shohet et al. ................... 60/226 |
| 4,089,493 | 5/1978 | Paulson ........................ 244/135 |
| 4,456,204 | 6/1984 | Hapke ........................... 244/55 |
| 4,684,081 | 8/1987 | Cronin .......................... 244/58 |
| 4,711,415 | 12/1989 | Biwder .......................... 244/55 |

*Primary Examiner*—Galen L. Barefoot
*Attorney, Agent, or Firm*—Beaton & Folsom

[57] ABSTRACT

A centerline mounted overbalanced multiple main jet engine configuration. The multiple jet engines are centerline mounted rather than parallel offset. While each jet engine is a "main" engine, capable of safely operating the aircraft in the event of a failure of the other engines, the engines are overbalanced in the sense that at least one of the main engines has substantially greater thrust than the other main engines. All of the main engines operate at critical periods of flight, but only one or the other of the main engines operates at other periods. The configuration of this invention combines the efficiency and performance of a single engined aircraft with enhanced safety advantages.

4 Claims, 3 Drawing Sheets

3X MULTI-ENGINE JET CONFIGURATION

FIELD OF THE INVENTION

This invention relates to multi-engine jet aircraft configurations, and more particularly to a centerline mounted "overbalanced" or "3x" multiple main engine configuration. The invention has particular utility for use in the business jet industry.

BACKGROUND AND SUMMARY OF THE INVENTION

Unlike a conventional multi-engine jet, the multiple jet engines of the "overbalanced" or "3x" jet engine configuration of this invention are centerline mounted. Moreover, while each engine according to the configuration of this invention is a "main" engine, capable of safely operating the aircraft in the event of a failure of the other engine(s), the engines are overbalanced in the sense that at least one of the main engines has substantially greater thrust than the other main engine(s).

Indeed, according to a preferred embodiment of this invention, there will be a single main engine having a thrust so far overbalanced in comparison to the thrust of the other mainengine(s) that (with reference to the main engines of the corresponding conventional configuration) a single overbalanced engine of this invention will have a thrust equal to the combined thrust of all the engines in the conventional configuration.

The relative thrust of the jet engines of this invention may be understood in comparison to a conventional multi-engine jet as follows, where "x" or "1x" is used to signify a thrust adequate to operate the aircraft at its design cruise speed, and, thus signifies a true multi-engine capacity. A conventional twin multi-engine jet aircraft is generally designed so that each of its two engines has a thrust equal to 1x, and a combined or total thrust equal to 2x. As a "true" multi-engine aircraft (as contemplated by such authorities as, for example, the United States Federal Aviation Administration and its regulations contained in 14 C.F.R. Part 25) it may be said that each of the 1x engines in a conventional twin jet is a true main engine.

In contrast, a preferred embodiment of a two engine configuration according to the present invention will also have two main engines, but one of them will have a thrust equal to the combined thrust of both engines of the conventional twin configuration. That is, according to the present invention, one engine will have 1x of thrust, and the other engine will have 2x of thrust. It follows that the total thrust of the two engines combined will be 3x. Thus, a preferred two engined version of this invention will be a true multi-engine aircraft in which each of the two engines is a true main engine, but in which a single one of the engines has thrust equal to the combined thrust of the comparable conventional twin, and in which the total combined thrust available substantially exceeds the combined thrust of the conventional twin.

According to the preferred method of using the configuration of this invention, it is intended that all of the main engines operate at critical periods of flight, but that only one of the main engines operate at other periods. In use, therefore, the aircraft of this invention is operated at certain phases of flight as a single engined aircraft (most often using the main engine with the significantly higher thrust) and yet having all of the thrust of the conventional multi; and it is operated at other phases of flight as a multi-engined aircraft having even more thrust than the conventional multi. The configuration of this invention realizes a combination of economy, performance and safety having unexpected advantages over either conventional single engine or conventional multi-engine configurations.

Economy, performance and safety are well known considerations in the aircraft industry, and the configuration of this invention will be discussed against this background. To be viable, an aircraft innovation should offer some advantageous mix of performance and safety enhancements at a reasonable economic price.

Important economic considerations include the initial cost and the operating costs of the aircraft. Included within an aircraft's operating costs are such components as fuel, overhaul and other maintenance costs. Those components can be compared against aircraft in different configurations to estimate the projected economies of each.

Performance of different configurations of an airframe can be compared by holding the airframes constant while varying only the engines and the engine configuration, comparing the rated thrust of the engines in one configuration against the rated thrust of the engines in another configuration. Various discounting or weighting elements may be factored into the performance account because of incidental changes in drag or weight or other matters associated with the different engine configurations or, for more basic or conservative calculations, a configuration that is expected to be "cleaner" can nonetheless be assumed to have no less drag than the airframe against which it is being compared (and any advantages in drag can be used to offset potential disadvantages in weight, and both factors may be omitted from the calculations).

Safety can be considered from several perspectives. A basic consideration is related to the multi-engine ratings and requirements codified in such places as part 25 of the regulations promulgated by the United States Federal Aviation Administration (14 C.F.R. Part 25 Airworthiness Standards: Transport Category).

Drawing from such standards as those, a first safety concern is simply that a "true" multi-engine configuration must allow for redundant engine thrust—in the event of an "engine-out" condition, the other remaining engine(s) must be able to meet all relevant requirements of FAR part 25, or other relevant standard without the power from the failed engine. In the course of the following discussion, "true multi-engine" or "true twin-engine" will refer to a configuration in which all relevant flight standards are meet even with one engine totally shut down.

Likewise drawing from such standards as those, but not limited to considerations of true multi-engine capability are other common safety margin ratings and concerns. A common safety measure is the so-called "balanced field length." This is a length calculated from stop to stop at full take-off gross weight, with an engine failure intervening. The exercise requires that, starting at one end of a runway at a full stop, an aircraft then (a) accelerate to rotation speed (rotation occurs when the aircraft rotates, for example, on its landing gear so as to take-off), (b) simulate an engine failure (so as to require an abort), (c) pause 2 seconds (to simulate the pilot's reaction time to the abort condition), and (d) come to a full stop at the other end of the runway (throttle retarded, full brakes). As used herein, the "balanced field length" corresponds generally to the "accelerate-stop distance" described by the United States Federal Aviation Administration in 14 C.F.R. Part 25, §25.109 (1993).

The "balanced field length" yields a number, say, 3,000 feet, which tells a pilot how much runway length he or she needs. The balanced field length is calculated at "normal" conditions, including a standard temperature at sea level. If all runways were well in excess of a particular airframe's balanced field length, this factor would become negligible, but even where an airfield is longer than a particular airframe's balanced field length at standard conditions, the balanced field length is known to vary as ambient conditions change.

It is well known, and charts are available to calculate the variations, that the balanced field length is sensitive to many conditions. Perhaps the two most important factors are temperature and altitude. The higher and hotter the ambient conditions, the longer the balanced field length becomes. That is, an airframe's balanced field length might be 3,080 feet standard, but 5,690 feet at 86° F. and at 5,000 feet altitude (higher and hotter than standard) as, for example, may occur at Denver, Colo., and many other airfields.

The balanced field length, as it changes based upon ambient conditions at any given runway is of vital concern to most pilots. For business jet aviation, it may mean that certain flight plans simply must be rerouted or canceled or altered. If, for example an aircraft has a balanced fieldlength under relevant ambient conditions of 5,690 feet, it simply cannot take-off safely at full weight from a runway of 3,500 feet, and a potentially short stage of a multi-stage flight that might have been routed through a 3,500 foot runway stop-over would have to be rerouted to a longer field. Alternatively, the pilot might have to create a shorter balanced field length by decreasing the aircraft's gross takeoff weight, perhaps offloading fuel, and then adding an intermediate stop-over at another airport to refuel.

It can be readily understood that an airframe's safety factor increases as its balanced field length decreases. In order to decrease the balanced field length, and given that only minimal savings can be reasonably attained in several of the stages involved in determining a balanced field length (abort, 2 second delay, throttle retard, and brake), it should be apparent that most savings will come from decreasing the length of the first stage (from stop to rotation). A decrease in the length required to go from a dead stop to rotation will most easily come from an increase in power. Thus, adding thrust will, other things being equal, decrease the balanced field length and increase the safety margin of an airframe.

Finally, and in addition to the safety factors having to do with true multi-engine capability, and a favorable balanced field length (that is, favorable in relation to the actual runways that may be required or preferred for use by an airframe under varying ambient conditions), a third safety factor may be referred to simply as critical stage margin. Dividing any flight into the components: (1) take-off and climb, (2) cruise, (3) descent, and (4) landing, it may be readily agreed that take-off and climb, and landing are critical stages of any flight.

It is not too great an oversimplification to say that a common wish of all pilots is to be flying an aircraft that has available an excess of power, particularly at the critical stages of flight. Despite the multiplicity of specific recovery techniques in the face of different emergencies in the critical stages, it is well known that having a great deal of power/ thrust at the pilot's disposal would be a preferred starting point before the trouble occurs.

With the foregoing measures of economy, performance and safety in mind, it should be readily apparent that a single engine aircraft is likely to more economical than a comparable multi-engine aircraft. If the airframe is designed for 3,800 pounds of thrust, it is probably more economical to purchase, overhaul, fuel and maintain a single 3,800 pound engine than a pair of 1,900 pound engines. Likewise (and under the assumption that the single has all the power of the combined thrust of the multi-engines against which it is being compared) a single 3,800 pound engine may be the better performer because it may produce less drag than two 1,900 pound engines, considering their mountings. On the other hand, a conventional single engine aircraft lacks the inherent safety advantages of a true multi-engine aircraft.

Accordingly, it should not be surprising (even without considering the incentives of any legal or regulatory climate that may be created by relevant governmental bodies in terms of true multi-engine ratings and requirements) that commercial aircraft powered by jet engines are almost universally multi-engined. Although it is generally agreed that a single-engine jet aircraft of equal power to a comparable multi would probably be a superior performing designs because of the inherent advantages of a single engine relative to multiple engines, and although it is generally acknowledged that such a single-engine jet could be readily designed using today's materials and know-how, there has been no significant commercial use of a single-engine design.

The problem is that the economy (and potential performance) advantages of a powerful single jet engine comes at a cost in terms of safety. A true multi-engine configuration provides for "engine out" backup performance and thus creates a margin of safety not possible with a single engine configuration.

It has long been supposed that the safety advantages of a true multi-engine configuration could never be combined with the economic and performance characteristics of a powerful single-engine configuration. For safety reasons, therefore, the conventional multi-engine configuration has been favored in business aviation at the expense of the efficiency and performance advantages that are might be attained with a single-engine configuration.

It is a specific goal of the configuration of this invention to combine favorable economies and performance with yet further enhanced safety features. The aircraft configuration of this invention attains efficiency and performance advantages of the kind associated with a powerful single engine, while also retaining the safety advantage of a true multi-engine configuration. These results are obtained by employing a centerline mounted, radically overbalanced multi-engine configuration so that the engines are functionally distinct, and by operating the overbalanced engines in a manner to take advantage of that functional distinction.

According to the configuration of this invention embodied in, for example, a two-engine mode, the two engines are of radically unequal thrust and are centerline mounted. But, while the engines are of unequal thrust, each of them is a true main engine in the sense that each of them can meet all "engine out" requirements for true multi-engine ratings. Finally, while there are two engines, they are run in various combinations of one only and both together so that the aircraft is frequently operating on only one or the other of its two engines.

The key concepts of this invention include these: the engines are centerline mounted; all engines of this invention have thrust of at least 1x (and are true main engines in a true multi-engine configuration); at least one of the main engines has a thrust greater than 1x; and the total thrust of "N" engines is greater than Nx. For ease of discussion in connection with certain calculated data presented later in this description, "3x" will designate a hypothetical two-engined jet according to this invention where the thrust of one main engine is equal to 1x; the thrust of the other main engine is approximately 2x; and the total power available with both engines running is approximately 3x. This invention is, however, not limited to that hypothetical embodiment.

The inventor is aware of no other airframe that has ever employed such an overbalanced multiple main centerline mounted jet engine configuration as that of this invention.

U.S. Pat. No. 4,089,493 of Paulson shows an aircraft with two in-line engines, but is not a true multi-engine aircraft and does not suggest the concept of multiple jet engines, both of which are main engines. The engines of Paulson include only one main (turboprop) engine, with a secondary (turbojet) engine. There is no suggestion that the secondary engine of Paulson is a main engine. That is, the secondary engine of Paulson is less than 1x, and, most importantly, the aircraft of Paulson is not a true multi-engine aircraft within the meaning of FAR part 25, as previously discussed herein.

U.S. Pat. Nos. 2,244,763 of Bugatti and 2,978,208 of Halsmer show aircraft with two propellers in line powered by two separate engines. Other examples of aircraft with two propellers mounted in line are shown in U.S. Pat. Nos. 1,850,066 of Altieri; 1,851,857 of Marney; and 2,540,991 of Price. Examples of aircraft having two engines mounted in-line and driving two separate blowers or propellers include U.S. Pat. Nos. 1,132,368 of Lorenc and Lorenc; 2,406,625 of Oglesby; and 2,523,938 of Berliner.

U.S. Pat. No. 4,684,081 of Cronin discloses an auxiliary power and emergency system using a free turbine, and U.S. Pat. No. 3,678,690 of Sohet et al. discloses a convertible composite engine with two engines concentric about a single centerline.

Thus, despite all the work previously done in airframe configurations, there remains a need for a jet engine configuration that can realize the economies and performance of a powerful single-engine jet while enhancing the safety factors typically associated with a true multi-engine configuration. It is a specific object of the overbalanced multiple main centerline mounted jet engine configuration of this invention to provide those benefits of economy, performance and enhanced safety.

DETAILED DESCRIPTION OF THE INVENTION

Figure 1:
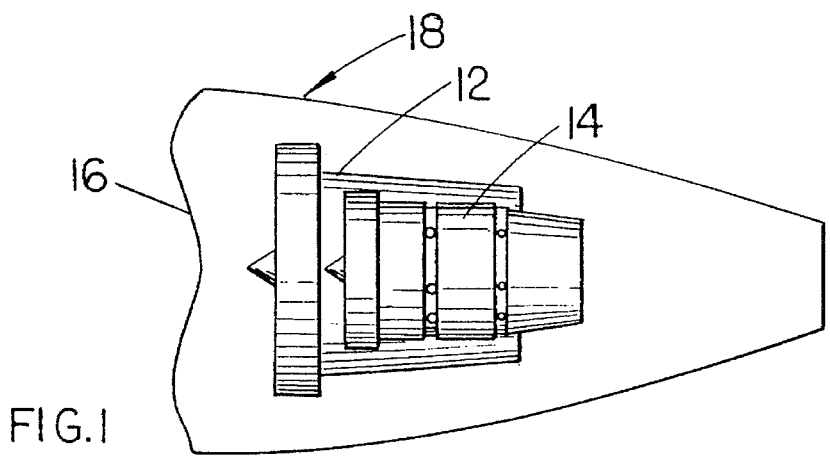
FIG. 1 is a top plan schematic view of a two engine layout according to this invention.
Figure 2:
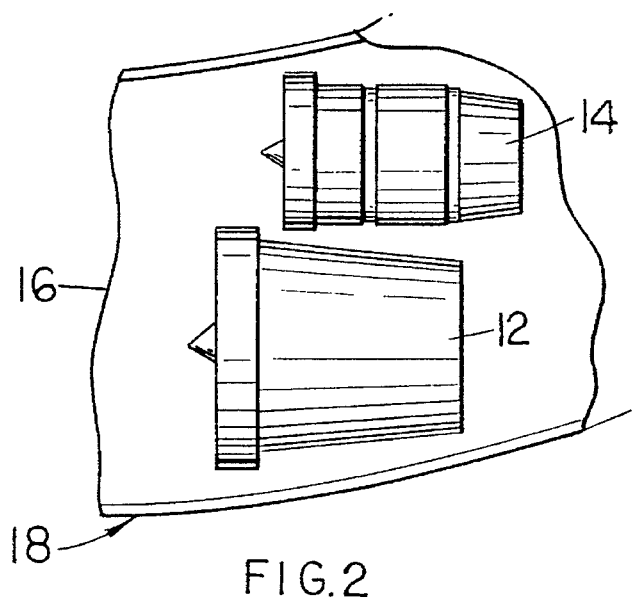
FIG. 2 is a side plan schematic view of the layout of FIG. 1.
Figure 3:
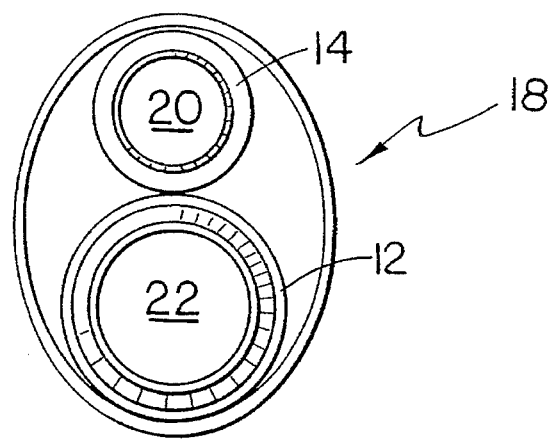
FIG. 3 is a rear schematic view of the layout of FIG. 1, showing an exhaust configuration.

This invention will first be discussed with reference to the schematics of FIGS. 1, 2 and 3 showing a two engine configuration, concentrating upon the engines. It will then be discussed in terms of the airframe configurations of FIGS. 4, 5 and 6 which lead up to the presentation of calculated comparisons of a hypothetical two engined aircraft produced according to this invention against a conventional twin jet in the prior art. Although much of the following discussion will be in reference to a two engine configuration, this invention is not so limited, but may be used with multi-engine configurations having more than two engines.

With reference to FIG. 1 (top view) and FIG. 2 (side view), it may be seen that a two engine embodiment of this invention includes a first main engine 12 and a second main engine 14. The second main engine 14 is mounted above and slightly behind the first main engine 12. As seen with reference to FIG. 3, exhaust 20 of second main engine 14 and exhaust 22 of first main engine 12 are carried directly out from the engines.

It should be understood that FIGS. 1, 2 and 3 are schematics in which the engines 12 and 14 are generally disposed within an airframe 18 along the centerline of the fuselage. The engines are near the rear of the fuselage and behind a passenger compartment generally indicated by reference numeral 16.

The schematics of FIGS. 1 and 2 are not intended to show such details as air intakes (which could be one or more scoops, "ice shedder" type nacelles, or a pop-up intake combined with scoops or ice shedders, or other form of air intake generally known in the field). While FIG. 3 shows a straight jet blast exhaust, with one outlet for each engine, it should be understood that the exhausts might be combined so that a single tube carries the exhaust from both engines, as is well known in the field.

Figure 4:
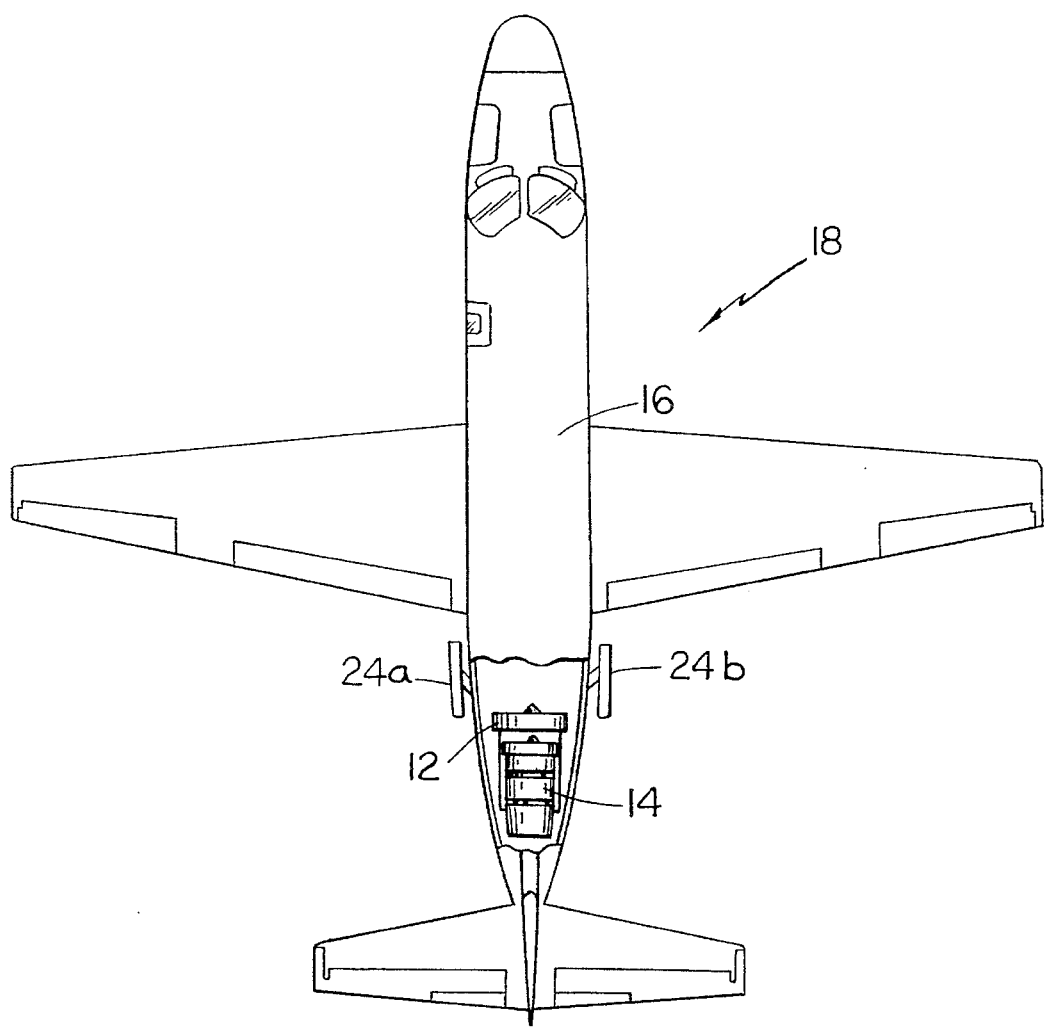
FIG. 4 is a top plan, partial cut-away view of a two engine 3x jet aircraft constructed according to this invention.

With reference to FIGS. 4 (top view) and 5 (side view), it may be better envisioned how the engine configuration of this invention can be adapted to an airframe. Using the reference numerals previously assigned, it can be seen that within the airframe 18, and behind a passenger compartment 16, the two engines 12 and 14 are mounted on the centerline of the fuselage with the second main engine 14 mounted above and slightly behind the first main engine 12. As shown in FIG. 4, air intake is provided by left (24a) and right (24b) ice shedder type intakes mounted in nacelles along the side of the fuselage.

Figure 6:
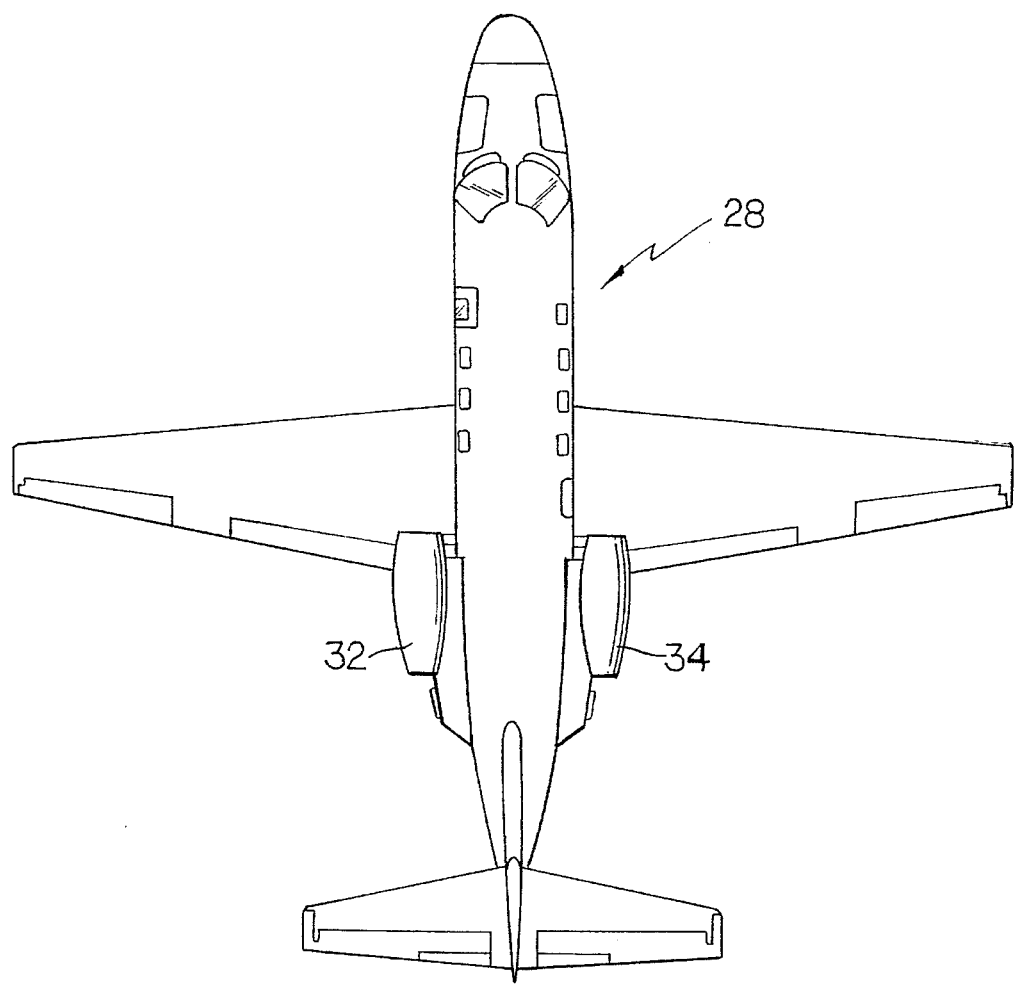
FIG. 6 is top plan view of a conventional twin engine aircraft in the prior art.

Finally, a conventional twin engine jet engine in the prior art is shown in FIG. 6. It may be seen that, in conventional aircraft 28, a left engine 32 and a right engine 34 are conventionally mounted on the sides of the fuselage.

Figure 5:
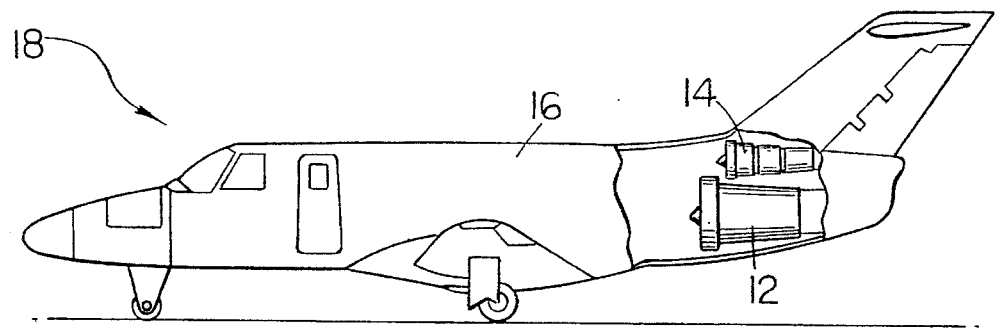
FIG. 5 is a side plan, partial cut-away view of the aircraft of FIG. 4.

With reference again to the two engine embodiment of this invention shown schematically in FIGS. 1 and 2, and shown in the context of an aircraft in FIGS. 4 and 5, the first main engine 12 has adequate thrust to propel the aircraft 18 at its design cruise speed without the assistance of the second main engine 14, but the first main engine has a higher thrust than the second main engine. The first main engine 12 will sometimes be referred to herein as the "primary" or "overbalanced" main engine. The second main engine 14 likewise has adequate thrust to operate the aircraft 18 safely in the event of primary engine failure. The second main 14 engine will sometimes be referred to herein as the "secondary" or "conventional" main engine.

Referring to the thrust adequate to operate any single engine of a twin-engine aircraft at the aircraft's design cruise speed as "1x", a conventional twin engine aircraft of the type shown in FIG. 6 may be thought of as a "2x" configuration. In a 2x configuration such as shown in FIG. 6, the twin engines may be referred to as 1x left (reference numeral 32) and 1x right (reference numeral 34). With this conventional 2x twin jet engine configuration in mind, it may now be understood that a two engine configuration of the instant invention as shown in FIG. 4 may be referred to as a 3x configuration.

According to the configuration of this invention, the primary or overbalanced main engine 12 has a thrust well in excess of the secondary or conventional main engine 14, as high as twice (or more) that of the conventional main. Hence, the primary engine 12 of this configuration may also be called a "2x" engine; and the secondary or conventional engine 14 of this configuration may also be called a "1x" engine.

The total power available in the two engine configuration of this invention, as shown in FIG. 4, is therefore 3x. Compared to the conventional twin of FIG. 6, the aircraft of this invention has a primary main engine 12 which alone has a thrust equal to the combined thrusts of engines 32 and 34 of the conventional twin. The aircraft of this invention also has a secondary main engine 14 which has thrust equal to the thrust of either of the conventional engines 32 or 34 of the conventional twin. And, finally, the two engined version of an aircraft 18 of this invention has a total thrust that is substantial greater (the thrust is 150% that of the conventional twin) than the total thrust of the conventional twin 28.

The foregoing terms 1x, 2x and 3x are intended 'simply to help clarify and better contrast the configuration of this invention (in a 3x, two engine mode as shown in FIGS. 1 through 5) from a conventional configuration (in a 2x twin as shown in FIG. 6). It should be understood, however, that the configuration of this invention is not limited to two-engine configurations, and also that the 2x and 3x terms are meant to cover a range which includes, but is not limited to, twice and three times, respectively, the thrust adequate to operate one of the engines of a multi-engine aircraft at the aircraft's design cruise speed.

Indeed, when certain hypothetical test case calculations are discussed later in this disclosure, it will be seen that a set of 1x and 2x engines is used in which the thrust of the 2x engine is not quite twice the thrust of the 1x. It is submitted, however, that the engines selected are reasonable for purposes of the comparison and that the 1x, 2x and 3x terms remain useful and are an appropriate terminology for understanding the configuration of this invention.

It has been seen, therefore, that the configuration of this invention is a true multi-engine aircraft, in which each of the engines has thrust adequate to power the aircraft in the event of an "engine out" condition, but in which the engines are unequal in thrust. In fact, each of the engines (the 2x and the 1x) is designed for a specific function, and the operation and function of the engines will be discussed next.

Method of Operation. Considering the phases of a flight previously mentioned, and using a two engined configuration for purposes of discussion, the two main engines of the overbalanced configuration of this invention are used as follows:

(1) during take-off and climb, both engines are running (total thrust is 3x), (2) during cruise, the 2x overbalanced main engine 12 is running and the 1x conventional main engine 14 is shut down (operational thrust is 2x), (3) during descent, the 2x overbalanced main engine 12 is running, and the 1x conventional main engine 14 is powered on at some point sufficiently in advance of landing as may be determined by prudent flight practices (in a preferred mode of operating, the 1x engine is powered on half-way down; but the 1x engine could be powered on earlier or later in the descent) (total thrust available is 2–3x), and (4) during landing, both engines are running (total thrust available is 3x).

Although taxi has not yet been considered as part of the flight, it contributes to an operating cost factor that should not be omitted. Optionally, during taxi, the 2x overbalanced main engine 12 may be powered off so that the 1x conventional main engine 14 provides sole thrust on taxi.

Thus, with the optional taxi procedure included, it may be understood that there is a phase during which only the secondary 1x conventional main engine 14 is running (and the primary 2x overbalanced main engine 12 is shut down), and a phase during which only the primary 2x overbalanced main engine 12 is running (and the secondary conventional main engine 14 is shut down). During both of these phases, the aircraft is for all relevant comparisons, performing as a single engine aircraft. At the same time, and at all times, at least two main engines are available and the aircraft thus has true multi-engine capability.

The use of the secondary 1x conventional main engine 14 in tandem with the primary 2x overbalanced main engine 12 on takeoff and landing provides an excess of power during the critical periods of flight beyond that typically achieved by a conventional multi-engine configuration (in a conventional multi-engine, the engines are all of the same thrust so that a conventional twin would be 2x; in the configuration of the instant invention, at least one of the engines has a thrust greater than the others so that a two engine version according to this invention would be greater than 2x) while its use alone during taxi provides a measure of economy associated with a single-engine jet. The availability of multiple main engines in the event of an "engine out" condition in one of the engines provides the multi-engine safety factor associated with a true multi-engine aircraft.

Conventional multi-engine jets are not centerline mounted. In a conventional twin, for example, one engine is mounted on the left and the other is mounted on the right. In an engine out condition, the off-center thrust of the remaining engine creates torque. While a skilled pilot can overcome this torque by careful application of the aircraft's control surfaces, this solution adds drag and degrades the aircraft's performance. According to the instant invention, the engines are centerline mounted. Because they are centerline mounted, there is no penalty (as by asymmetrical thrust in the conventional configuration) in using only a single engine, either the primary engine 12 or the secondary engine 14, during taxi, cruise, or any other phase of operation of the configuration of this invention.

Now that both the configuration and the method of operating the configuration of this invention has been discussed, certain calculated comparisons will be introduced to indicate the general viability of the invention in terms of projections of economy, performance and safety.

Calculated Viability Studies (Performance and Operational Costs of the 3x Configuration compared to conventional airframes)

Calculated Comparisons. The foregoing discussion has, at various points, contrasted: (a) single-engined aircraft against multi-engined aircraft, and (b) conventional multi-engine jet engine designs against the overbalanced centerline multi-engine configuration of this invention.

In the discussion which follows, and for the sake of clarity, the contrast will be against twin-engined aircraft configurations. The discussion will compare a 3x centerline mounted overbalanced twin jet configuration according to this invention (FIG. 4) against a 2x conventional twin jet in the prior art (FIG. 6). The following discussion will provide a background for understanding how the 3x overbalanced centerline mounted twin jet configuration of this invention approaches the economy and performance of a powerful single-engined jet, while also providing an enhanced margin of safety over a 2x conventional twin jet.

General Assumptions and Notes. In assessing both the economics and performance of an aircraft configuration, a series of test cases can be constructed so as to model expected performance. The following data will be presented in terms of four test cases, calculated to to help present the concept of this invention. While each of the test cases varies from the others, all four share many common assumptions. Those general assumptions will be presented here, and then the four cases will be presented, and the further particular assumptions used in each case will be discussed in connection with each case.

While the advantages of this invention may be better understood in light of calculated comparisons between the expected operation of an aircraft configuration according to this invention and a popular existing aircraft, it should be emphasized that this is not experimental data but rather is hypothetical, calculated data which is provided to demonstrate the concept. These calculated comparisons are hypothetical and are not intended to suggest that the results are actual values obtained by the conversion of an existing aircraft.

The inventor has attempted to make the following hypothetical comparisons based upon "normal day-to-day operations," modeling the way the aircraft could be expected to be flown by informed, well trained pilots. Flight profiles, power settings and airspeeds simulate what is believed to be good, everyday operations.

In all of the comparisons that follow, these assumptions will be used:

2x Conventional Jet. This represents modeled data based upon a popular entry level business jet in current use, and generally depicted in FIG. 6. The 2x conventional Jet uses twin WILLIAMS/ROLLS ROYCE-manufactured engines (32 and 34 with reference to FIG. 6) of 1,900 pounds thrust each. The engines are mounted on the left and right rear of the fuselage and will be referred to as 1x (left) and 1x (right). The 2x conventional jet will develop a total (2x) thrust of 3,800 pounds.

3x Jet. This represents modeled data based upon the configuration of this invention, as shown in FIG. 4. It will be assumed that the conventional 2x airframe is modified so as to accept the configuration of this invention, and that the 3x airframe, therefore, is the standard 2x conventional airframe except for the engines and their layout. The primary (2x) engine 12 for the 3x Jet will be modeled on a GARRETT-manufactured 3,500 pound thrust engine. The secondary (1x) engine 14 for the 3x Jet will be modeled on the same WILLIAMS/ROLLS ROYCE-manufactured 1,900 pound thrust engine used in the conventional 2x jet. The primary and secondary engines 12 and 14 will be mounted in the fuselage of the 3x Jet behind the passenger compartment, with the secondary engine mounted above and slightly behind the primary engine, all as previously discussed in reference to FIG. 4. The thrust of the engines will be dispersed along the centerline of the 3x Jet airframe.

Operation of the 2x Jet and the 3x Jet. Both engines of the 2x conventional jet will run at all stages of flight. Each of the left and right 1x engines of the 2x conventional jet will develop 1,900 pounds of thrust, and the aircraft will develop 3,800 pounds of total thrust. In contrast, the 3x jet of this invention will have a 2x engine developing 3,500 pounds of thrust and a 1x engine developing 1,900 pounds of thrust (5,400 pounds total). The engines of the 3x jet will be operated as follows:

(1) during take-off and climb, both engines are running (total thrust is 5,400 pounds, or nearly 3x), (2) during cruise, the 2x overbalanced main engine 12 is running and the 1x conventional main engine 14 is shut down (operational thrust is 3,500 pounds, or nearly 2x)

(3) during descent, the 2x overbalanced main engine 12 is running, and the 1x conventional main engine 14 is powered on at some point sufficiently in advance of landing as may be determined by prudent flight practices (in a preferred mode of operating, the 1x engine is powered on half-way down; but the 1x engine could be powered on earlier or later in the descent) (total thrust available is 3,500 to 5,400 pounds or nearly 2 to 3x), and (4) during landing, both engines are running (total thrust available is 5,400 pounds or nearly 3x).

The foregoing operation of the 3x jet will be common to all of the cases presented below. However, in the four particular cases presented under the operational cost study comparisons, certain refinements will be introduced (for example, in certain cases, only the 1x engine will be used on taxi; and other cases will compare the results of turning on the 1x engine later in the descent).

Average trip length. It is assumed that the average trip will be 700 nautical miles, which is believed to accurately represent the average trip length for business jets of the 2x conventional type.

Cruising altitude. It is assumed that the aircraft will cruise at 39,000 feet, which is believed to accurately represent a favorable cruising altitude for the 2x conventional type aircraft on a 700 nautical mile trip.

Yearly use. It is assumed that the aircraft will be flown 300 hours/year, which is believed to accurately represent the average usage of this class of jet.

Aircraft speed, time to climb, and time en route. These will be taken as a function of: engine thrust, altitude, and weight. Both the 2x conventional jet and the 3x jet of this invention will be modeled on a take-off weight of 10,400 pounds, with the weight decreasing over time in flight as fuel is consumed.

Operational costs. These costs will include fuel costs, overhaul costs, and other maintenance costs. Fuel costs will be held constant, and fuel consumption will be taken as a function of engine thrust. Overhaul costs will be held constant, and based upon published and estimated costs of overhaul, and reasonable time between overhauls. Other maintenance costs are based upon published and estimated costs per hour.

Other factors and qualifications. It is anticipated that more sophisticated modeling, and actual airframe testing with specifically designed components that could be produced to enhance the advantages of the 3x design could indicate different, and perhaps yet higher performance and/or economy for the 3x Jet than will be presented below.

For example: (a) an optimum engine selection could produce a primary (2x) engine that develops more thrust than shown above (that is, an engine having thrust of 3,800 pounds rather than 3,500 pounds); (b) the 3x might run at a higher service ceiling than the 2x (for purposes of modeling, the cruise altitude was set at 39,000 feet—given its climb advantages, it could make for better performance to cruise the 3x at an altitude higher than 39,000 feet, resulting in a potentially faster cruising speed than will be shown below); (c) a steeper angle of descent for the 3x could be taken into account, resulting in greater fuel cost savings than will be shown below; (d) the drag of the 2x conventional jet's twin engine mounting pods, and the anticipated lower drag of the 3x Jet's air intake, could result in faster times and higher performance for the 3x Jet than will be shown below.

On the other hand, the 3x Jet might weigh more than the 2x conventional jet because of the added weight of the 2x engine compared to the 1x engine, but it is believed that any disadvantage to the 3x stemming from this factor should be relatively minor in comparison to the foregoing potential further advantages.

Although more sophisticated modeling or testing could be expected to lead to different results, it is believed that, for the purposes of illustrating the concept of the 3x Jet of this invention, the hypothetical data that will presented below should serve sufficiently to indicate generally the performance, safety and economy that can be anticipated to be attained from the configuration of this invention.

The following calculations are intended to model the performance, safety and economy of this invention as compared to conventional airframes (the economy models will be presented under the caption "operational cost studies"). The calculations will presented under the headings: (A) Performance/Safety; (B) Operational Cost Studies; and (C) Summary. The Operational Cost Studies will be presented in four cases, so as to present a range of values based upon variable factors.

A. Performance/Safety

Based on calculated numbers (hypothetical numerical analysis, without airframe testing) the following performance results might be expected:

phases of flight, producing substantially greater thrust than is available to the conventional 2x Jet. The slightly slower cruise speed of the 3x Jet is attributed to the fact that, for purposes of this modeled data, the primary 2x engine of the 3x Jet was assumed to be a 3,500 pound GARRETT engine, which in fact produces somewhat less than two times the thrust of the 1,900 pound WILLIAMS/ROLLS ROYCE engine of the conventional 2x Jet. Because both of the conventional 2x Jet's 1,900 pound twin engines are running during cruise, and only the primary engine of the 3x Jet is running during cruise, the calculated 3x Jet is assumed to be slightly slower (by about 3%) than the conventional jet. But, because the total flight time includes climb as well as cruise, the 3x Jet makes up the lost cruising time in the overall time.

B. Operational Costs

Based on calculated numbers (hypothetical numerical analysis, without airframe testing) the following performance results might be expected (the results are presented according to several cases, based on variable factors as explained below):

1. Case One. In addition to the general assumptions set forth above, Case One also includes these factors:

(a) the 3x Jet's secondary (1x) engine overhaul is included in the cost calculations;

(b) both of the 3x Jet's engines are on for taxi; and (c) the 3x Jet's secondary (1x) engine is started about half-way down on descent (that is, at 19,000 ft).

Based on calculated numbers (hypothetical numerical analysis, without airframe testing) the following operational cost results might be expected:

| Factor | Conventional 2x Jet | | | 3x Jet | | |
|---|---|---|---|---|---|---|
| | Left 1x | Right 1x | 2x (total) | Primary 2x | Second'y 1x | 3x (total) |
| Overhaul ($/Hour) | $ 42.86 | $ 42.86 | $ 85.71 | $ 47.62 | $11.55 | $ 59.17 |
| Other maint ($/Hour) | 32.54 | 32.54 | 65.08 | 40.35 | 8.16 | 48.51 |
| Fuel ($/Hour) | 125.70 | 125.70 | 251.40 | 204.14 | 29.32 | 233.46 |
| Total: | 201.10 | 201.10 | 402.20 | 292.10 | 49.03 | 341.13 |

| Factor | 2x Jet | 3x Jet |
|---|---|---|
| Balanced Field Length (5,000 feet; 86° F.) | 5,690 feet | 3,090 feet |
| Time to Climb to 39,000 feet | 33 minutes | 12.9 minutes |
| Cruise Speed | 350.4 knots | 339.6 knots |
| Total Flight Time (700 NM trip) | 127 minutes | 126 minutes |

It follows that, if the actual aircraft perform as modeled, the 3x jet's take-off performance (balanced field length, high and hot) is superior to that of the conventional design. The 3x Jet's climb performance is excellent, and its cruise speed and total flight time are competitive (the total flight times of the two modeled airframes are essentially equal).

The superior take-off and climb performance of the 3x Jet can be attributed to the fact that both the primary (2x) and secondary (1x) engines of the 3x Jet are running during these The overhaul costs were estimated based upon $150,000.00 per overhaul on the 1x (WILLIAMS/ROLLS ROYCE) engines used in both the 2x Jet and the 3x Jet, and 3,500 hours between overhauls (the 1x engine used in the 3x Jet is assumed to run during only 26.95% of the operational time of the 3x Jet - this is based on the performance calculations and flight profile of the 3x Jet). The overhaul cost of the 2x (GARRETT) engine used in the 3x Jet is estimated based upon $200,000.00 per overhaul and 4,200 hours between overhauls.

The other maintenance costs were estimated based upon Aircraft Bluebook entries for other GARRETT engines; the 1x (WILLIAMS/ROLLS ROYCE) engines were assumed to have maintenance costs 75% of the GARRETT; and the 1x engine used in the 3x Jet is assumed to run only 26.95% of the operational time of the 3x Jet.

The fuel costs were based on the flight profile and performance data set forth above (700 nautical mile flight; cruise at 39,000 feet; with the 2x Jet taking 127 total minutes in the air for each flight, with 33 minutes of climb; and with the 3x Jet taking 126 total minutes in the air for each flight, with 13 minutes of climb - descent speed was assumed to be the same for both aircraft). Fuel consumption was projected on the basis of thrust in light of the calculated flight profiles.

According to the calculated operational costs under Case One, the 2x Jet costs $402.20 per hour and the 3x Jet costs $341.13 per hour. It follows that, if the actual aircraft perform as modeled, the 3x Jet will save $61.06 per hour. This translates into the following savings:

Savings in 300 hours: $18,319.44

Savings in 1,000 hours: $61,064.79

Savings in 4,500 hours: $274,791.54

More sophisticated modeling or testing (or financial modeling including adjustments for future cost increases and the time value of money) could be expected to lead to different results, but for the purposes of illustrating the concept of the 3x Jet of this invention, the hypothetical data presented above should serve sufficiently to indicate the operational cost advantages that can be anticipated to be attained from the configuration of this invention.

2. Case Two. In addition to the general assumptions set forth above prior to the consideration of special cases, Case Two also includes these factors:

(a) the 3x JeW's Secondary (1x) engine overhaul is not included in the cost calculations;

(b) both of the 3x Jet engines are on for taxi; and (c) the 3x Jet's secondary (1x) engine is started about half-way down on descent (that is, at 19,000 feet).

It can be understood that Case Two differs from Case One only in assumption (a) above. While the overhaul costs of the 3x Jet's Secondary/1x engine were included in Case One, they are not included in Case Two. Because the time between overhaul for these 1x engines is 3,500 hours, and the 1x engine of the 3x Jet is running only 26.95% of the operational time of the 3x Jet, it would take more than 40 years of normal airframe usage (assuming 300 hours/year of use) between overhauls of the 1x engine of the 3x Jet. Accordingly, it might be deemed not unreasonable to omit the overhaul costs of the 1x engine of the 3x Jet, and Case Two is designed to illustrate the results when that factor is omitted.

Based on calculated numbers (hypothetical numerical analysis, without airframe testing) the following operational cost results might be expected according to Case Two:

for the 2x Jet calculations, and not in the 3x Jet calculations (because, in the 3x Jet configuration, and on the assumption of 300 hours/year of operation, this engine will go 40 years between overhauls). Other assumptions are as in Case One.

According to the calculated operational costs under Case Two, the 2x Jet costs $402.20 per hour and the 3x Jet costs $329.58 per hour. It follows that, if the actual aircraft perform as modeled in Case Two, the 3x Jet will save $72.61 per hour. This translates into the following savings:

Savings in 300 hours: $21,784.44

Savings in 1,000 hours: $72,614.79

Savings in 4,500 hours: $326,766.54

More sophisticated modeling or testing (or financial modeling including adjustments for future cost increases and the time value of money) could be expected to lead to different results, but for the purposes of illustrating the concept of the 3x Jet of this invention, the hypothetical data presented above should serve sufficiently to indicate the operational cost advantages that can be anticipated to be attained from the configuration of this invention.

3. Case Three. In addition to the general assumptions set forth above prior to the consideration of special cases, Case Three also includes these factors:

(a) the 3x Jet's secondary (1x) engine overhaul is not included in the cost calculations;

(b) both of the 3x Jet engines are not on for taxi, but only the secondary (1x) engine of the 3x Jet is used for taxi; and (c) the 3x Jet's secondary (1x) engine is started about half-way down on descent (that is, at 19,000 feet).

It can be understood that Case Three differs from Case One in both of assumptions (a) and (b) above, and that it differs from Case Two only in assumption (b) above. The overhaul costs of the 3x Jet's secondary (1x) engine were included in Case One, but they are not included in either Case Two or Case Three for the reasons discussed in connection with Case Two above. Because both engines of the 3x Jet are centerline mounted, there will be no asymmetric thrust upon single engine operation. Accordingly, lit is a reasonable operating procedure to taxi the 3x Jet using only the 1x engine, thereby saving additional fuel and other costs.

Based on calculated numbers (hypothetical numerical analysis, without airframe testing) the following operational cost results might be expected according to Case Three:

| Factor | Conventional 2x Jet | | | 3x Jet | | |
| --- | --- | --- | --- | --- | --- | --- |
| | Left 1x | Right 1x | 2x (total) | Primary 2x | Second'y 1x | 3x (total) |
| Overhaul ($/Hour) | $ 42.86 | $ 42.86 | $ 85.71 | $ 47.62 | $ 0.00 | $ 47.62 |
| Other maint ($/Hour) | 32.54 | 32.54 | 65.08 | 40.35 | 8.16 | 48.51 |
| Fuel ($/Hour) | 125.70 | 125.70 | 251.40 | 204.14 | 29.32 | 233.46 |
| Total: | 201.10 | 201.10 | 402.20 | 292.10 | 37.48 | 329.58 |

As in Case One, the overhaul costs were estimated based upon $150,000.00 per overhaul on the 1x (WILLIAMS/ROLLS ROYCE) engines used in both the 2x Jet and the 3x Jet, and 3,500 hours between overhauls. But, unlike Case One, the overhaul costs of the 1x engine are included only

| Factor | Conventional 2x Jet | | | 3x Jet | | |
|---|---|---|---|---|---|---|
| | Left 1x | Right 1x | 2x (total) | Primary 2x | Second'y 1x | 3x (total) |
| Overhaul ($/Hour) | $ 42.86 | $ 42.86 | $ 85.71 | $ 44.50 | $ 0.00 | $ 44.50 |
| Other maint ($/Hour) | 32.54 | 32.54 | 65.08 | 40.35 | 8.16 | 48.51 |
| Fuel ($/Hour) | 125.70 | 125.70 | 251.40 | 197.22 | 29.32 | 226.54 |
| Total: | 201.10 | 201.10 | 402.20 | 282.08 | 37.48 | 319.55 |

As in Case Two, the overhaul costs of the 1x engine are included only for the 2x Jet calculations, and not in the 3x Jet calculations (because, in the 3x Jet configuration, and on the assumption of 300 hours/year of operation, this engine will go 40 years between overhauls). Furthermore, these numbers are based on using only the 1x engine when the 3x Jet is taxiing. This saves both overhaul and fuel costs associated with the 2x engine (which is now shutdown for the taxi portion of the flight profile, which is presumed to be 7%). Other assumptions are as in Cases One and Two.

According to the calculated operational costs under Case Three, the 2x Jet costs $402.20 per hour and the 3x Jet costs $319.55 per hour. It follows that, if the actual aircraft perform as modeled in Case Three, the 3x Jet will save $82.64 per hour. This translates into the following savings:

Savings in 300 hours: $24,793.14

Savings in 1,000 hours: $82,643.79

Savings in 4,500 hours: $371,897.06

More sophisticated modeling or testing (or financial modeling including adjustments for future cost increases and the time value of money) could be expected to lead to different results, but for the purposes of illustrating the concept of the 3x Jet of this invention, the hypothetical data presented above should serve sufficiently to indicate the operational cost advantages that can be anticipated to be attained from the configuration of this invention.

4. Case Four. In addition to the general assumptions set forth above prior to the consideration of special cases, Case Four also includes these factors:

(a) the 3x Jet's secondary (1x) engine overhaul is not included in the cost calculations;

(b) both of the 3x Jet engines are not on for taxi, but only the secondary (1x) engine of the 3x Jet is used for taxi; and (c) the 3x Jet's secondary (1x) engine is not started about half-way down on descent (that is, at 19,000 feet), but is started at 10,000 feet.

It can be understood that Case Four differs from Case One in all of assumptions (a), (b) and (c) above, that it differs from Case Two in assumptions (b) and (c) above, and that it differs from Case Three only in assumption (c) above. The overhaul costs of the 3x Jet's secondary (1x) engine were included in Case One, but they are not included in any of Cases Two, Three or Four for the reasons discussed in connection with Case Two above. As in Case Three, only the secondary (1x) engine of the 3x Jet is used on taxi. In the prior cases, it was assumed that the pilot would turn on the 1x engine of the 3x Jet during descent at about the half-way point (when the aircraft descends to 19,000 feet). Taking into account likely actions by different pilots, Case Four is based on the assumption that the 1x engine may not be started until further down in the descent (that is, when the aircraft descends to 10,000 feet). This would result in further savings of fuel costs associated with the 1x engine.

Based on calculated numbers (hypothetical numerical analysis, without airframe testing) the following operational cost results might be expected according to Case Four:

| Factor | Conventional 2x Jet | | | 3x Jet | | |
|---|---|---|---|---|---|---|
| | Left 1x | Right 1x | 2x (total) | Primary 2x | Second'y 1x | 3x (total) |
| Overhaul ($/Hour) | $ 42.86 | $ 42.86 | $ 85.71 | $ 44.50 | $ 0.00 | $ 44.50 |
| Other maint ($/Hour) | 32.54 | 32.54 | 65.08 | 40.35 | 8.16 | 48.51 |
| Fuel ($/Hour) | 125.70 | 125.70 | 251.40 | 197.22 | 25.69 | 222.91 |
| Total: | 201.10 | 201.10 | 402.20 | 282.08 | 33.85 | 315.92 |

As in Cases Two and Three, the overhaul costs of the 1x engine are included only for the 2x Jet calculations, and not in the 3x Jet calculations (because, in the 3x Jet configuration, and on the assumption of 300 hours/year of operation, this engine will go 40 years between overhauls). As in Case Three, these numbers are based on using only the 1x engine when the 3x Jet is taxiing. This saves both overhaul and fuel costs associated with the 2x engine (which is now shutdown for the taxi portion of the flight profile, which is presumed to be 7%). Further, it is assumed that the 1x engine is not started on descent until the aircraft comes down to 10,000 feet. Other assumptions are as in Cases One, Two and Three.

According to the calculated operational costs under Case Four, the 2x Jet costs $402.20 per hour and the 3x Jet costs $315.92 per hour. It follows that, if the actual aircraft perform as modeled in Case Four, the 3x Jet will save $86.27 per hour. This translates into the following savings:

Savings in 300 hours: $25,882.05

Savings in 1,000 hours: $86,273.50

Savings in 4,500 hours: $388,230.77

More sophisticated modeling or testing (or financial modeling including adjustments for future cost increases and the time value of money) could be expected to lead to different results, but for the purposes of illustrating the concept of the 3x Jet of this invention, the hypothetical data presented above should serve sufficiently to indicate the operational cost advantages that can be anticipated to be attained from the configuration of this invention.

Range of Operational Cost Savings (Cases One through Four). As calculated above, it is estimated that the operating costs for the 3x Jet will be between approximately $61.00 to $86.00 per hour less than the costs of the 2x Jet, depending on the operational procedures used. The inventor believes that Case Three, which calculates a saving of $82.64 per hour, is a reasonable set of operating procedures that results in substantial cost savings.

Of course, it may be assumed that the 3x Jet will cost more to deliver than the 2x Jet with the precise amount being difficult to estimate (on the assumption that a 2x Jet might sell for about $3 million new, it might be reasonable to assume that the 3x Jet would sell for $3.125 million new). For purposes of illustrating the concept of the 3x Jet of this invention, however, the foregoing operational cost comparisons should serve sufficiently to indicate that a reasonable cost recovery (assuming that the 3x Jet will be more expensive than a conventional aircraft) is theoretically possible, thereby combining good economies with the enhanced performance characteristics previously discussed.

That is, the calculated range of operational cost savings suggest that the 3x concept is not only desirable in terms of the enhanced performance (and associated safety margin) expected, but that it is also a commercially viable concept.

C. Summary of Calculated Viability Studies. All of the foregoing calculated viability studies (performance and operational cost) may be summarized as follows, using Case Three for the operational cost amounts:

| Factor | 2x Jet | 3x Jet | 3x compared to 2x Jet (in percent) |
|---|---|---|---|
| Initial cost | $3 million | $3.125 million | Costs 4% more |
| Operating cost ($/Hour) | $402.20 | $319.55 | Saves 25.9% |
| Balanced Field Length | 5,690 feet | 3,090 feet | Improved by |

| Factor | 2x Jet | 3x Jet | 3x compared to 2x Jet (in percent) |
|---|---|---|---|
| (5,000 feet; 86° F.) | | | 84.1% |
| Time to Climb (to 39,000 feet) | 33 minutes | 12.9 minutes | Faster by 255.8% |
| Cruise Speed | 350.4 knots | 339.6 knots | Slower by 3.2% |
| Total time (700 NM) | 127 minutes | 126 minutes | About the same |

Accordingly, it may now be understood that the 3x jet engine configuration of this invention, which is not limited to two-engined aircraft, provides performance and safety advantages and is economically viable. As used herein "jet" means conventional jet, fan jet and other variations.

What is claimed is:

1. A twin-engine jet aircraft configuration, comprising:
   (a) an airframe having a centerline along its longitudinal axis;
   (b) a first jet engine mounted within a plane vertical to the centerline;
   (c) a second jet engine mounted within said plane vertical to the centerline;
   (d) each of said first and second jet engines having a thrust adequate to takeoff, climb, cruise and land the aircraft at full gross weight without use of the other engine;
   (e) one of said first and second jet engines having a maximum thrust greater than the maximum thrust of the other of said first and second engines.

2. The configuration of claim 1, wherein said maximum thrust greater than the maximum thrust of the other of said engines is at least 120% the maximum thrust of the other engine.

3. A multi-engine aircraft configuration, comprising:
   (a) an airframe having a centerline along its longitudinal axis;
   (b) at least two jet engines mounted within a plane vertical to the centerline;
   (c) each of said at least two jet engines having a thrust adequate to takeoff, climb, cruise and land the aircraft at full gross weight without use of the any other engine;
   (d) one of said at least two jet engines having a maximum thrust greater than the maximum thrust of the other of said engines.

4. The configuration of claim 3, wherein said maximum thrust greater than the maximum thrust of the other of said engines is at least 120% the maximum thrust of the other engine.

* * * * *